United States Patent
Clark et al.

(10) Patent No.: US 10,277,615 B2
(45) Date of Patent: Apr. 30, 2019

(54) MAINTENANCE OF DISTRIBUTED COMPUTING SYSTEMS

(71) Applicant: Walmart Apollo, LLC, Bentonville, AR (US)

(72) Inventors: Jimmie Russell Clark, Fayetteville, AR (US); Christopher Soames Johnson, Pea Ridge, AR (US); Jeffrey Stone, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 254 days.

(21) Appl. No.: 15/258,488

(22) Filed: Sep. 7, 2016

(65) Prior Publication Data

US 2017/0078311 A1   Mar. 16, 2017

Related U.S. Application Data

(60) Provisional application No. 62/217,437, filed on Sep. 11, 2015.

(51) Int. Cl.
*H04L 29/06* (2006.01)
*G06F 21/56* (2013.01)

(52) U.S. Cl.
CPC ........ *H04L 63/1416* (2013.01); *G06F 21/564* (2013.01); *H04L 63/145* (2013.01); *H04L 63/1425* (2013.01)

(58) Field of Classification Search
CPC .................................................. H04L 63/1416
USPC ......................................................... 726/23
See application file for complete search history.

(56) References Cited

U.S. PATENT DOCUMENTS

| | | |
|---|---|---|
| 6,233,621 B1 | 5/2001 | Pascal et al. |
| 7,580,993 B2 | 8/2009 | Schwerk |
| 7,716,196 B2 | 5/2010 | Ghielmetti et al. |
| 7,809,763 B2 | 10/2010 | Nori et al. |
| 7,882,089 B1 | 2/2011 | Levy |
| 8,024,306 B2 | 9/2011 | Palliyil et al. |
| 2001/0042171 A1 | 11/2001 | Vermeulen |
| 2014/0020109 A1* | 1/2014 | Mraz ................... H04L 63/0428 726/26 |
| 2014/0181119 A1 | 6/2014 | Chiueh et al. |
| 2015/0163248 A1* | 6/2015 | Epstein ................. G06F 21/604 726/1 |
| 2015/0227536 A1 | 8/2015 | Montulli et al. |

OTHER PUBLICATIONS

International Search Report and Written Opinion from related PCT International Application PCT/US2016/050501 dated Nov. 29, 2016.

* cited by examiner

*Primary Examiner* — Jacob Lipman
(74) *Attorney, Agent, or Firm* — McCarter & English, LLP; David R. Burns

(57) ABSTRACT

Systems, methods, and non-transitory computer readable media providing build and deploy a known file and identify unknown files found on the system. The method provides, deploying a file, creating a unique hash tag identifier and metadata associated with the file. A database entry is created for the hash tag identifier and metadata associated with the file. An unknown file is discovered on the system, a unique hash code identifier is generated and searched for in the database. If the unique hash code identifier is found the metadata is retrieved and returned for display, however if the hash code identifier is not found the unknown file is marked as a candidate for removal and deleted from the system.

19 Claims, 5 Drawing Sheets

MAINTENANCE OF DISTRIBUTED COMPUTING SYSTEMS

CROSS-REFERENCE TO RELATED PATENT APPLICATIONS

This application claims priority to U.S. Provisional Application No. 62/217,437 filed on Sep. 11, 2015, the content of which is hereby incorporated by reference in its entirety.

BACKGROUND

Large corporations typical have geographically distributed computing systems. Maintenance of such distributed computing systems can be challenging, particularly when there a problem associated with the computing systems. For example, when a server hosting one or more software applications ceases to function properly or has diminished resources, it is necessary to find, diagnose, and resolve the issue to restore the operation of the server. In some instances, the software applications being hosted or executed by the server can be the source of the problem (e.g., due to corrupt computer files, computer viruses, incompatibility, out-of-date versions of the software application, etc.). To resolve the problems with the function or operation of the server, it may be necessary to resolve the problems associated with the software applications hosted or executed by the server.

SUMMARY

Embodiments described herein provide a system, method and computer readable medium for advantageously deploying files and storing information associated with the file using a unique signature (e.g., such as hash code) and a look up table so that the information can be efficiently accessed when needed. The system, method and computer readable medium provide for a computerized improvement to the functioning of a computer system by identifying problematic unknown files found in the system by retrieving metadata associated with that file, which will reduce a burden on the servers and databases as all the information regarding the unknown file may be presented using one query rather than multiple queries. This reduction is resource consumption is specifically advantageous for environments that receive and process high volumes data traffic, which can result in malfunction of servers and database systems.

Exemplary embodiments present a system for improved maintenance of a distributed computing system including software servers hosting one or more computer files. In exemplary embodiments, the system includes one or more data storage devices including a non-transitory computer-readable media storing a deployment database and a binary repository. In exemplary embodiments, a build system is executed by a selected one of the servers including a processor communicatively coupled to the one or more data storage devices to facilitate communication between the processor and the deployment database and between the processor and the binary repository, in response to receiving a known computer file to be deployed. In exemplary embodiments, the build system generates a unique signature for the known computer file, generates metadata for the known computer file, creates an entry in the deployment database including the unique signature for the known computer file, associates the metadata with the unique signature in the deployment database, and deploys the known computer file into the binary repository to distribute the known computer file to one or more of the software servers in the distributed computing system. Exemplary embodiments provide an identification system executed by the selected one of the servers or a different one of the servers including a processor communicatively coupled to the one or more data storage devices to facilitate communication between the processor and the deployment database, in response to receiving a problematic computer file that is deployed in the distributed computing system and causing an issue in the distributed computing system. In exemplary embodiments, the identification system generates a unique signature for the problematic computer file, and submits a query including the unique signature for the problematic computer file to determine whether the problematic computer file is the known computer file. In exemplary embodiments, in response to the signature of the problematic computer file matching the signature of the known computer file, the deployment database returns the metadata providing information for resolving the issue, and, in response to determining that the database contains no matches for the signature of the problematic computer file, the identification system determines that the problematic computer file is unidentifiable and a candidate for removal from the distributed system to resolve the issue.

Exemplary embodiments provide a method for improved maintenance of a distributed computing system including software servers hosting one or more computer files. In exemplary embodiments the method includes executing a build system, by a selected one of the servers that includes a processor communicatively coupled to one or more data storage devices to facilitate communication between the processor and a deployment database stored on the one or more data storage devices and between the processor and a binary repository stored on the one or more data storage devices, in response to receiving a known computer file to be deployed. In exemplary embodiments the build system generates a unique signature and metadata for the known computer file. In exemplary embodiments, the build system in the method creates an entry in the deployment database including the unique signature for the known computer file. In exemplary embodiments, the build system associates the metadata with the unique signature in the deployment database. In exemplary embodiments the build system deploys the known computer file into the binary repository to distribute the known computer file to one or more of the software servers in the distributed computing system. In exemplary embodiments, an identification system is executed, by a selected one of the servers including a processor communicatively coupled to the one or more data storage devices to facilitate communication between the processor and a deployment database and between the processor and a binary repository, in response to receiving a problematic computer file that is deployed in the distributed computing system and causing an issue in the distributed computing system. In exemplary embodiments, the identification system generates a unique signature for the problematic computer file. In exemplary embodiments the identification system submits a query including the unique signature for the problematic computer file to the deployment database to determine whether the problematic computer file is the known computer file. In exemplary embodiments, in response to the signature of the problematic computer file matching the signature of the known computer file, the deployment database returns the metadata providing information for resolving the issue, and, in response to determining that the database contains no matches for the signature of the problematic computer file, the identification system determines that the problematic computer file is unidentifiable and a candidate for removal from the distributed system to resolve the issue.

Exemplary embodiments provide a non-transitory computer readable memory medium storing instructions for improved maintenance of a distributed computing system including software servers hosting one or more computer files. In exemplary embodiments the instructions execute a build system to facilitate communication between the processor and a deployment database stored on the one or more data storage devices and between the processor and a binary repository stored on the one or more data storage devices, in response to receiving a known computer file to be deployed. In exemplary embodiments the build system generates a unique signature and metadata for the known computer file. In exemplary embodiments, the build system creates an entry in the deployment database including the unique signature for the known computer file. In exemplary embodiments, the build system associates the metadata with the unique signature in the deployment database. In exemplary embodiments, the build system deploys the known computer file into the binary repository to distribute the known computer file to one or more of the software servers in the distributed computing system. In exemplary embodiments the instructions execute an identification system, by a selected one of the servers including a processor communicatively coupled to the one or more data storage devices to facilitate communication between the processor and a deployment database and between the processor and a binary repository, in response to receiving a problematic computer file that is deployed in the distributed computing system and causing an issue in the distributed computing system. In exemplary embodiments, the identification system generates a unique signature for the problematic computer file. In exemplary embodiments, the identification system submits a query including the unique signature for the problematic computer file to the deployment database to determine whether the problematic computer file is the known computer file. In exemplary embodiments, in response to the signature of the problematic computer file matching the signature of the known computer file, the deployment database returns the metadata providing information for resolving the issue, and, in response to determining that the database contains no matches for the signature of the problematic computer file, the identification system determines that the problematic computer file is unidentifiable and a candidate for removal from the distributed system to resolve the issue.

In exemplary embodiments, the metadata includes, filename, version date of creation, vendor name, programmer name, build identification parameter, information associated with deployment the known computer file, or information associated with a user or group responsible for maintenance of the known computer file or the one or more of the software servers to which the known computer file is distributed.

In exemplary embodiments, a known computer file or the problematic computing file is an executable file.

In exemplary embodiments, the identification system provides command line prompt to query the database.

In exemplary embodiments, the metadata is displayed on a display for a user in response to the deployment database retrieving the metadata for the problematic computer file.

In exemplary embodiments, the signature for the problematic computer file is not found in the deployment database.

In exemplary embodiments, the identification system removes the problematic computer file in response to determining the problematic computer file is a candidate for removal.

Any combination and/or permutation of embodiments is envisioned. Other embodiments, objects, and features will become apparent from the following detailed description considered in conjunction with the accompanying drawings. It is to be understood, however, that the drawings are designed as an illustration only and not as a definition of the limits of the present disclosure.

BRIEF DESCRIPTION OF DRAWINGS

Illustrative embodiments are shown by way of example in the accompanying drawings and should not be considered as a limitation of the present disclosure.

DETAILED DESCRIPTION OF EXEMPLARY EMBODIMENTS

Figure 1:
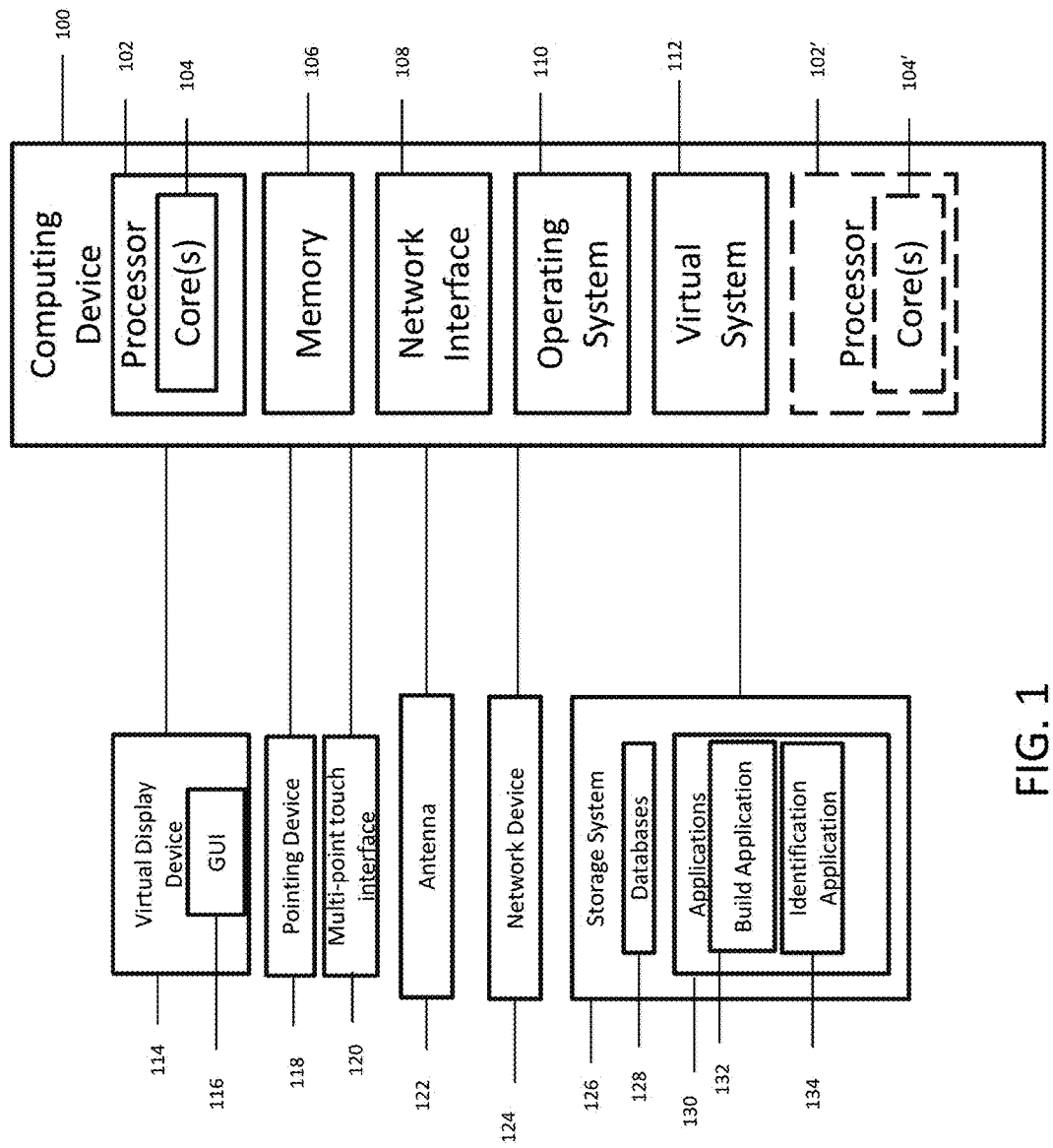
FIG. 1 is a block diagram of an example computing device for implementing exemplary embodiments of the present disclosure.

Described in detail herein are methods, systems, and computer-readable media associated with maintaining distributed computing systems including the deployment of known computer files to computing devices in the computing system and monitoring the computer computing devices as well as the computer files hosted by the computing devices for problems or potential problems to be resolved. For example, in addition to identifying and facilitating resolution of problems associated with known software hosted by computing devices in the computing system, exemplary embodiments, provide for identifying problematic computer files residing on the computing devices and provides for the identification and/or removal of the problematic computer files to maintain an operation or performance of the computing devices in the computing system and to maintain an operation or performance of the computing system itself.

In exemplary embodiments, known computer file may be deployed to one or more computing devices in a computing system according to one or more deployment processes. For example, when a known computer file is to be deployed to computing devices in a computing system, embodiments of the present disclosure can generate a unique signature for the known computer file that is based on the contents of the computer file itself as well as metadata associated with the known computer file. The unique signature can be associated with the metadata, and the unique signature and metadata associated with the known computer file can be stored in a deployment database and the known computer file can be added to a binary repository. The binary repository can manage the deployment of the known computer file according to one or more parameters and/or instructions associated with the known computer file. In some embodiments, the one or more parameters and/or instructions can be included in the metadata stored in the database.

In exemplary embodiments, computing devices of a computing system can be monitored via one or more maintenance processes to identify problems associated with an operation or performance of the computing devices in the computing system and can facilitate resolution of the problems. For example, exemplary embodiments of the present disclosure can monitor the computer files on the computing devices in the computing system to discover and/or identify problematic computer files (e.g., known or unknown computer files that are or can cause problems in the computing system. In exemplary embodiments, when problematic computer file is found on the computing system, exemplary embodiments of the present disclosure can generate a unique signature for the problematic computer file. Exemplary embodiments of the present disclosure can construct a query, in one or more query languages, including the unique signature and can submit the query to a deployment database. In exemplary embodiments, if the signature of the problematic corresponds to any of the signatures stored in the deployment database, it can be determined the problematic computer file is an instance of a previously deployed known computer file, and can retrieve the metadata associated with the known computer file to facilitate resolution of a problem associated with the problematic computer file. In exemplary embodiments, if the signature of the problematic computer file does not correspond to any of the signatures stored in the deployment database, the problematic computer files is determined to be an unknown file and can be marked as a candidate for removal to maintain the integrity of the computing system and/or one or more notifications can be generated to alert individuals of the existence of the unknown computer file in the computing system. In exemplary embodiments, the problematic unknown computer files marked as candidates for removal can be automatically removed from the computing system or quarantined. The following description is presented to enable any person skilled in the art to maintain distributed computing systems including the deployment of known computer files to computing devices in the computing system and monitoring the computer computing devices as well as the computer files hosted by the computing devices for problems or potential problems to be resolved. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that example embodiments of the present disclosure may be practiced without the use of these specific details. In other instances, well-known structures and processes are shown in block diagram form in order not to obscure the description of example embodiments with unnecessary detail. Thus, the present disclosure is not intended to be limited to the embodiments shown, but is to be accorded the widest scope consistent with the principles and features disclosed herein.

FIG. 1 is a block diagram of an example computing device 100 that may be used to implement exemplary embodiments of the present disclosure. The computing device 100 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 106 included in the computing system 100 may store computer-readable and computer-executable instructions or software (e.g., applications) for implementing exemplary operations of the computing device 100. The computing device 100 also includes configurable and/or programmable processor 102 and associated core(s) 104, and optionally, one or more additional configurable and/or programmable processor(s) 102' and associated core(s) 104' (for example, in the case of computer systems having multiple processors/cores), for executing computer-readable and computer-executable instructions or software stored in the memory 106 and other programs for implementing exemplary embodiments of the present disclosure. Processor 102 and processor(s) 102' may each be a single core processor or multiple core (104 and 204') processor.

Virtualization may be employed in the computing system 100 so that infrastructure and resources in the computing system 100 may be shared dynamically. A virtual machine 112 may be provided to handle a process running on multiple processors so that the process appears to be using only one computing resource rather than multiple computing resources. Multiple virtual machines may also be used with one processor.

Memory 106 may include a computer system memory or random access memory, such as DRAM, SRAM, EDO RAM, and the like. Memory 106 may include other types of memory as well, or combinations thereof.

A user may interact with the computing system 100 through a visual display device 114, such as a computer monitor, which may display one or more graphical user interfaces 116, multi touch interface 120, and a pointing device 118.

The computing device 100 may also include one or more storage devices 126, such as a hard-drive, CD-ROM, or other computer readable media, for storing data and computer-readable instructions and/or software that implement exemplary of the computing device 100 (e.g., applications 130 including build system 132, an identify system 134). The execution of the build system 132 by the processor 102 can facilitate deployment of known computer files using one or more deployment processes. The execution of the identification system 134 by the processor 102 can facilitate discovery and identification of problematic computer files (e.g., problematic known and/or unknown computer files) using one or more maintenance processes. Exemplary storage device 126 may also store one or more databases 128 for storing any suitable information required to implement exemplary embodiments. For example, exemplary storage device 126 can include one or more databases 128 for storing information, such as computer file signatures (e.g. unique hash codes) identifying a deployed computer files along with metadata associated with the deployed known computer files. The databases 128 may be updated manually or automatically at any suitable time to add, delete, and/or update one or more data items in the databases.

The computing device 100 can include a network interface 108 configured to interface via one or more network devices 124 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. In exemplary embodiments, the computing system can include one or more antennas 122 to facilitate wireless communication (e.g., via the network interface) between the computing device 100 and a network. The network interface 108 may include a built-in network adapter, network interface card, PCMCIA network card, card bus network adapter, wireless network adapter, USB network adapter, modem or any other device suitable for interfacing the computing device 100 to any type of network capable of communication and performing the operations described herein.

The computing device 100 may run any operating system 110, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 100 and performing the operations described herein. In exemplary embodiments, the operating system 110 may be run in native mode or emulated mode. In an exemplary embodiment, the operating system 110 may be run on one or more cloud machine instances.

In exemplary embodiments described herein, upon execution of the build system 132 by the processor 102, can build and deploy a known file. In exemplary embodiments, upon execution of the build system 132 a unique signature (e.g., a unique hash code identifier) may be generated for the known file. In exemplary embodiments, upon generating the unique signature, the build system 132 may generate metadata associated with the known file. In exemplary embodiments metadata may include but is not limited to, filename, version date of creation, vendor name, programmer name, a name of a group or person responsible for maintaining the known file as deployed in the computing system, a name of a group or person responsible for maintaining a particular server hosting an instance of the known file, and a build ID. In exemplary embodiments, the signature (e.g., the unique hash code identifier) for the known file and metadata associated with the known file can be entered into the databases 128 for storage.

In exemplary embodiments, upon execution of the identification system 134 using the processor 102 may provide one or more graphical user interfaces through which problematic file may be discovered and/or identified. In exemplary embodiments, execution of the identification system 134 by the processor 102 may generate a signature (e.g., unique hash code identifier) for problematic computer file. In exemplary embodiments, execution of the identification system 134 by the processor 102 can construct a query including the signature of the problematic computer file (e.g., a unique hash code identifier for the problematic computer file), which can be compared against the contents of the databases 128 to determine whether the problematic computer file is an instance of a known computer file deployed in the computer system (e.g., because instances of a particular known computer file will have the same signature). If the problematic computer file corresponds to a known computer file, the identification system 134 retrieves the metadata associated with the known computer file to facilitate resolution of problems/issues associated with the problematic computer file. In exemplary embodiments, execution of the identification system 134 by the processor 102 can provide one or more graphical user interfaces through which the metadata returned by the databases 128 can be rendered on the display 114. In exemplary embodiments, a query against the databases 128 using the signatures (unique hash code identifier) of the problematic computer file may not return any results. In such instances, the problematic computer file is identified as an unknown computer file. In exemplary embodiments, when the query does not return any results (e.g., the signature of the problematic computer file does not correspond to any of the signatures of known computer files stored in the databases 128), the identification system 134 can mark the unknown file as candidate for removal from the server hosting the unknown computer file and/or can mark the unknown computer file (including any other instances of the unknown computer file) in the computing system as a candidate for removal. In exemplary embodiments, execution of the identification system 134 by the processor 102 may provide one or more graphical user interfaces through which the unknown computer files marked as candidates for removal can be quarantined and/or removed from the server found to be hosting the unknown computer file and/or from the computing system. In other embodiments, the identification system 134 may generate metadata associated with an unknown file and can allow for the identification, verification, validation, authentication, and approval of the unknown computer file so that the signature (e.g., unique hash code identifier) and metadata associated with the unknown computer file is added to the databases 128 for storage. For such embodiments, the identification system 134 can search for other instances of the previously unknown computer file and can add information regarding deployment of the previously unknown computer file to the databases 128.

Figure 2:
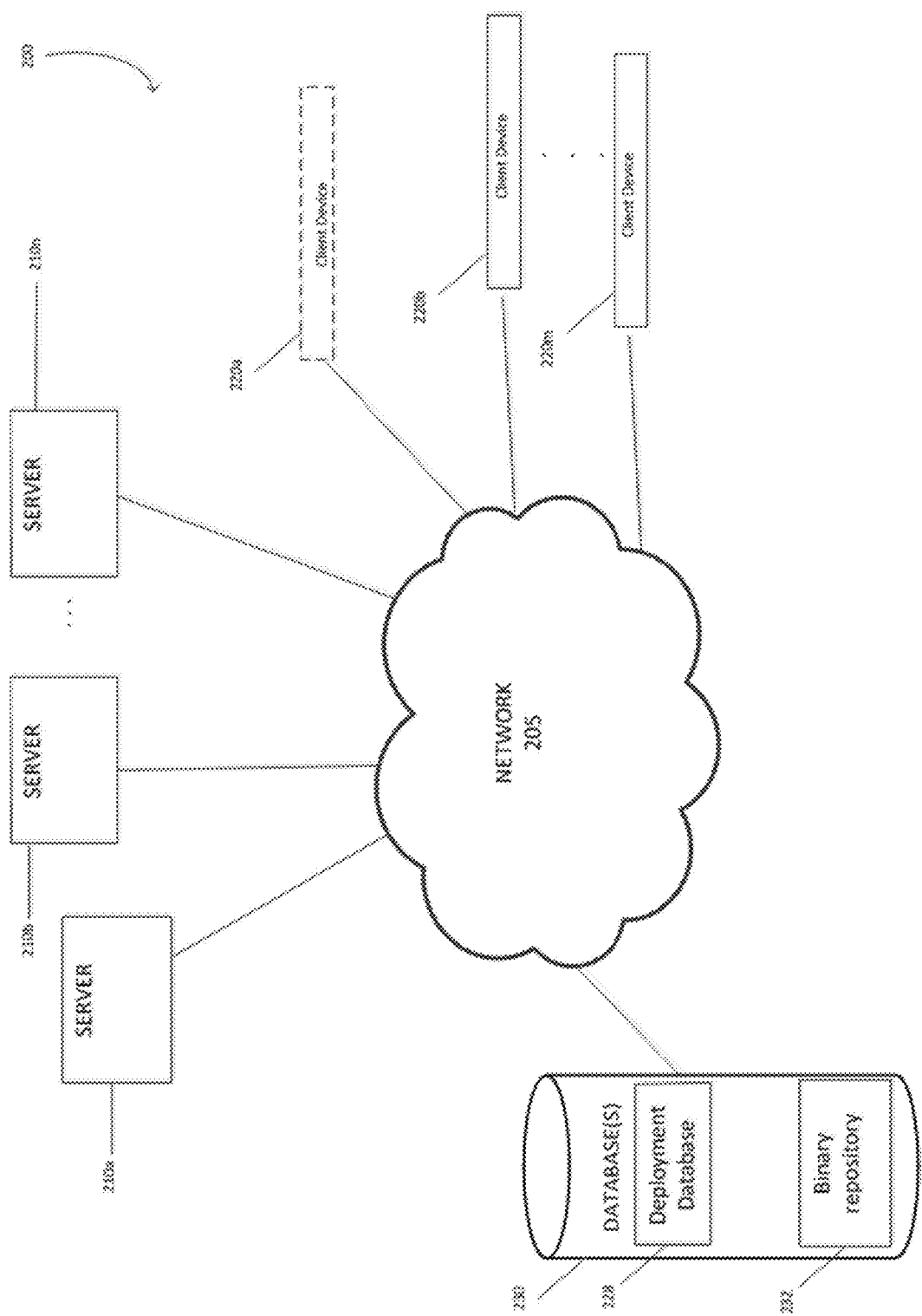
FIG. 2 illustrates an exemplary distributed environment including computing devices in communication with each other via a communications network in accordance with exemplary embodiments of the present disclosure.

FIG. 2 illustrates a distributed computing system 200 including servers 210*a-n*, client devices 220*a-m*, and database(s) 230 in communication with each other via a communications network 205. In exemplary embodiments, computer files can be stored, accessed, and/or executed on the servers 210*a-n* and the client devices 220*a-m*. The distributed computing system 200 can be an enterprise computing system in which the deployment of at least some computer files can be controlled and can occur from one or more designated devices. As one example, the servers 210*a*, 210*b* can be configured to deploy computer files to other servers (e.g., servers 210*c*, 210*n*) and/or client device 220*a*-220*n* upon execution of an embodiment of the build system 132, which can be hosted and executed by the servers 210*a*, 210*b* to implement embodiments of a deployment process as described herein. To maintain the computing system one or more servers 210*b*, 210*c* can be configured to execute an embodiment of the identification system 134 to implement embodiments of a maintenance process as described herein.

In an example embodiment, one or more portions of network 205 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The client devices 220a-m can be implemented as embodiments of the computing device 100 (shown in FIG. 1) (e.g., with or without the systems 132, 134 or portions thereof) and may comprise, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, smartphones, tablets, netbooks, and the like. While servers 210a, 210b have been described as being configured with the build system, in some embodiments, one or more of the client device 220a-m may be configured with the build system 132 or portions thereof, e.g., to generate and store a unique hash code identifier and metadata associated with a known file in preparation for deployment, and may be used to deploy the known file into a binary repository (e.g., upon execution of a build system 132 or portions thereof), and/or one or more of the client devices 220a-m can be configured with the identification system 134 or portions thereof, e.g., to identify problematic computer files (e.g., upon execution of maintenance process). The user computing devices 207 can include more or fewer components than the computing device 100 shown in FIG. 1.

The client devices 220a-m may connect to network 205 via a wired or wireless connection and may include one or more applications or systems. In some embodiments, the client devices 220a-m can include a client side application, such as a web browser (and/or a program specific to the systems 132 and 134), that allows the client devices to communicate and interact with applications (e.g., systems 132 and/or 134) hosted by one or more of the servers 210a-n. For example, the server 210b can host the build system 132 and/or the identification system 134, and the client devices 220a-m can execute the client-side application to interact with the systems 132 an 134.

The database 230 may store information/data, as described herein. For example, the database 230 may include a deployment database 228 and a binary repository 232. In exemplary embodiments the deployment database 228 may store signatures (e.g., unique hash code identifiers) and metadata for known deployed computer files. In exemplary embodiments, the binary repository 232 may store the known deployed files and may facilitate deployment of the know computer files.

In some embodiments, the database(s) 230 may be included within server 210.

Figure 3:
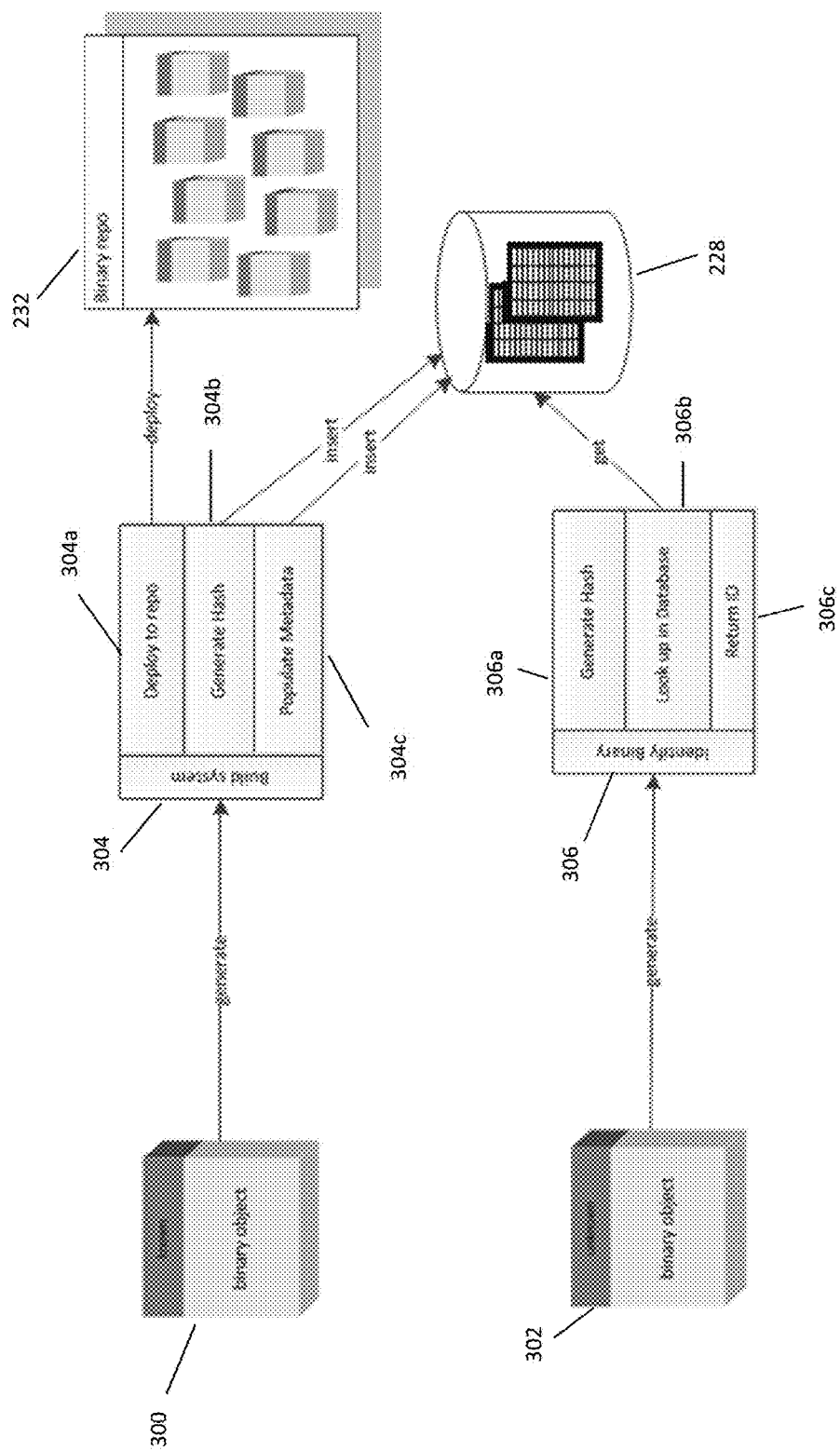
FIG. 3 is a block diagram that illustrates example components for the maintenance of a distributed computing system in accordance with exemplary embodiments of the present disclosure.

FIG. 3 is a block diagram illustrating an interaction of components of exemplary embodiments of the present disclosure to deploy known computer files, and monitor, discover, identify, and/or address problematic computer files in a computing system. In exemplary embodiments, a known computer file 300, can be prepared for deployment. The types of computer files may include, but are not limited to, executable files, binary files, text files, audio files, video files, application files, zip files, and/or any other suitable file types that can be stored, accessed, executed, and/or modified in a computing system. In exemplary embodiments, a build system 304 (e.g., residing on a server and being executed by a processor of the server) can call a "deploy to repository" software routine 304a. The software routine 304a can add the known computer file 300 to the binary repository 232 to facilitate deployment of the known computer file 300 to one or more computing device (e.g., severs and/or client devices) in the computing system. In exemplary embodiments, prior to deployment of the known computer file 300, during deployment of the known computer file 300, or after the known computer file 300 is deployed, the build system 304 can call a "generate hash" software routine 304b that can be executed (e.g., by a processor of a server) to generate a unique signature for the known computer file 300 in the form of a hash code identifier. The signature can be generated based on the content and/or metadata of the known computer file such that each time the generate hash subroutine generates a signature for an instance of the known computer file, the signatures will be identical, unless the content and/or metadata of an instance of the known computer file changes. In exemplary embodiments, the software routine 304b can insert the unique signature, generated for the known computer file 300, into the deployment database 228. The build system 304 can call a "generate metadata" software routine 304c that can be executed (by a processor of a server) to generate metadata for the known computer file 300, can insert the metadata into the deployment database 228, and can associate or link the metadata for the known computer file 300 with the unique signature for the known computer file 300. In exemplary embodiments, the metadata inserted into the database 225 can include, but is not limited to: a filename, a version, a date created, a vendor name, a programmer name, a build identifier, a group or individual responsible for maintaining the known computer file, a group or individual responsible for maintaining a computing device on to which the known computer file is deployed, and/or any other suitable information about the known computer file.

In exemplary embodiments, problematic computer file 302 can discovered/found on one or more of the computing devices (e.g., servers, client devices) in a computer system. In exemplary embodiments, the problematic computer file can be a computer file that is causing problems in the computer system. For example, the problematic computer file can be adversely affecting a performance or operation of the computing system, adversely affecting a performance or operation of one or more computing devices in the computing system, creating a security risk or a potential security risk for the computing system or one or more computing device in the computing system, and/or can be causing other problems in the computing system. In some instances, the problematic computer file can be, but is not limited to, a computer virus, an old version of an application, a version of an application that is incompatible with the computing device or computing system to which it is file is deployed, a corrupted file, and the like. In exemplary embodiments, an "identify binary" software routine 306 can be executed (e.g., by a processor of a server) to identify and address a problematic computer file 302. The software routine 306 can call the "generate hash" software routine 306a to generate a unique signature (e.g., unique hash code identifier) for the problematic computer file. After generating the signature for the problematic computer file, the software routine 306a can call a "lookup in database" software routine 306b which queries the database 225 using the signature (e.g., the unique hash code identifier. In exemplary embodiments, the signature can be used as a key to the database 225 to identify whether there are any database entries associated with the signature that include metadata. The software routine 306 can call return an id software routine 306c to retrieve metadata associated with the signature for the problematic computer file 302 when the signature is found in the database 225. In exemplary embodiments, if the signature is not found in the database 225, the problematic computer file 302 is an unknown computer file that is not identifiable by the software routine 306.

Figure 4:
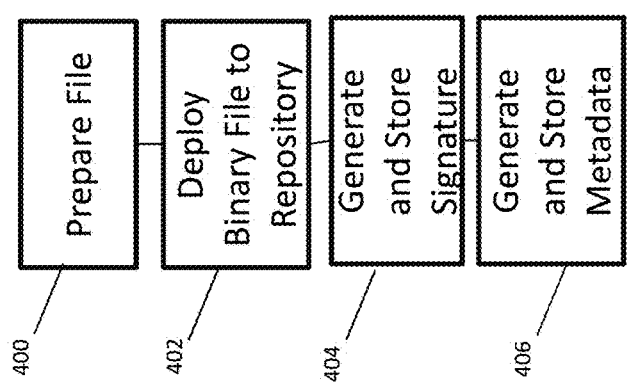
FIG. 4 is a flowchart illustrating a maintenance process for a distributed computing system in which known computer files are deployed to one or more computing devices in the distributed computing system according to exemplary embodiments of the present disclosure.

FIG. 4 illustrates the process of building and deploying a known computer file 300 according to exemplary embodiment. In exemplary embodiments, in operation 400 the known computer file 300 may be prepared to be deployed, via the build system 132 residing on the server and being executed by a processor of the server. In exemplary embodiments, execution of the build system 132 by the server may provide the user the user interface 116 rendered on a client device via, e.g., a client-side application. The user interface 116 may facilitate deploying the known computer file 300 by providing an interface to select the known file 300 for deployment. In exemplary embodiments, the known computer file 302 may be, but is not limited to, an executable, text file, music file, movie file, application file, and the like. In exemplary embodiments, the known computer file 300 may be deployed for reasons including but not limited to, upgrade the system, update a file and launch a new file and/or any other suitable file types that can be stored, accessed, executed, and/or modified in a computing system.

In operation 402, the client device transmits instructions to the server to deploy the known computer file 300 based on the user's selection using the build system 132. In exemplary embodiments, the build system 132 can add a the known computer file to the into the binary repository 232. In exemplary embodiments, the binary repository 232 may store an instance of deployed files. In exemplary embodiments, execution of the build system 132 by the server can cause the server to transmit and/or store a link to or instance of the known computer file in the binary repository 232 as well as in the deployment database 228.

In operation 404, using the build system 132, the processor of the server can generate a unique signature for the known computer file 302 in the form of a hash code identifier using an embodiment of the hash subroutine. The signature can be generated based on the content and/or metadata of the known computer file such that each time the generate hash subroutine generates a signature for an instance of the known computer file, the signatures will be identical, unless the content and/or metadata of an instance of the known computer file changes. In exemplary embodiments, the build system 132 can be executed by the processor of the server to cause the processor to insert the unique signature in the deployment database 228. In exemplary embodiments the hash code identifier can be generated by the build system 132 using a hash function.

In operation 406, the build system 132 can be executed by the processor of the server to facilitate the generation of metadata for the known computer file 300. The metadata can includes, but is not limited to, a filename, a version date of creation, vendor name, programmer name, build identification parameter, information associated with deployment the known computer file, a build identifier, a group or individual responsible for maintaining the known computer file, a group or individual responsible for maintaining a computing device on to which the known computer file is deployed, and/or any other suitable information about the known computer file. In exemplary embodiments, the build system 132 can be executed by the processor of the server to associate or link the metadata for the known computer file 300 with the unique signature for the known computer file 300 and can store the metadata in the database 228. In exemplary embodiments, the unique hash code identifier for the known computer file 302 can point to the data record storing the metadata.

Figure 5:
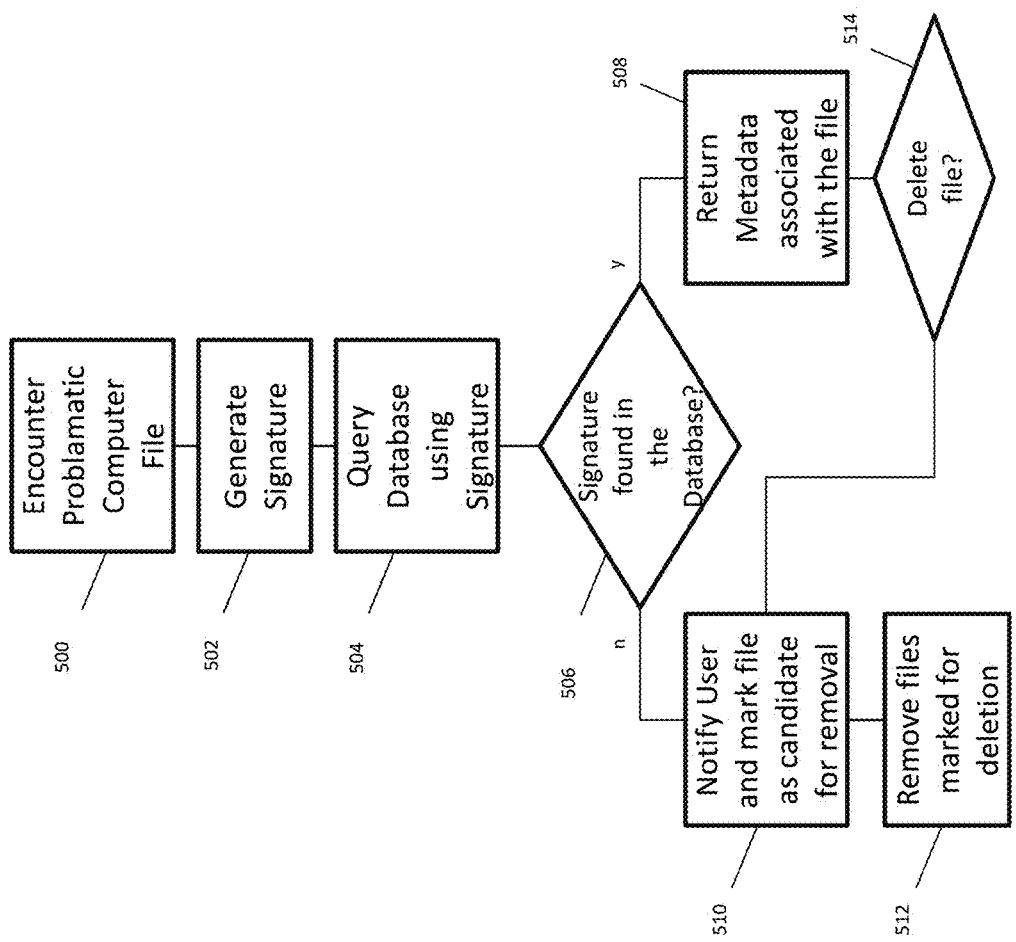
FIG. 5 is a flowchart illustrating a maintenance process of monitoring computing devices in a distributed computing system for problematic computer files according to exemplary embodiments.

FIG. 5 illustrates the process of identifying an problematic computer file 302 according to exemplary embodiments. In exemplary embodiments, in operation 500 problematic computer file 302 can discovered/found on one or more of the computing devices (e.g., servers, client devices) in a computer system. In exemplary embodiments, an embodiment of the identification system 134, running on device computing device (e.g., a server or client device), can provide a user interface 116 to the user. In exemplary embodiments, identification system 134 can present an interface through which an instance of the problematic computer file 302 can be uploaded or input to the identification system 134. In exemplary embodiments, the problematic computer file can adversely affect a performance or operation of the computing system, adversely affect a performance or operation of one or more computing devices in the computing system, create a security risk or a potential security risk for the computing system or one or more computing device in the computing system, and/or can cause other problems in the computing system. In some instances, the problematic computer file can be, but is not limited to, a computer virus, an old version of an application, a version of an application that is incompatible with the computing device or computing system to which it is file is deployed, a corrupted file, and the like.

In operation 502, the identification system 134 can be executed by the processor the computer device to generate a unique signature for the problematic computer file. In exemplary embodiments, the unique signature can be generated in the form of a hash code identifier for the problematic computer file. In exemplary embodiments the identification system 134 can be executed to launch a hash function to generate the hash code identifier. In exemplary embodiments, the hash function utilized by the identification system to generate the hash code identifier can be identical to the hash function utilized by the build system to generate the hash code identifier.

In operation 504, the identification system 134 can be executed by the processor of the computing device to cause the computing device to query the deployment database using the unique signature for the problematic computer file 302 to retrieve the metadata for the problematic computer file 302 from the deployment database 228. In exemplary embodiments, the server may query the deployment database 228 using the signature or a portion thereof as a search key.

In operation 506, the results from the query are returned to the processor of the computing device. In operation 508, if the query returns metadata associated with the problematic file, the identification system determines that the problematic computer file is a known computer file, and the metadata is output by the identification system 134 to present the metadata to a user via the user interface 116. In exemplary embodiments, the metadata of the problematic computer file 302 may be used to resolve any problems caused by the problematic computer file. In exemplary embodiments, in operation 514, the problematic computer file can be marked for deletion, revision, upgrading, and/or any other suitable action.

In operation 510, if the database does not return metadata for the problematic computer file 302, the identification system 134 can determine that the problematic computer file is unknown and can output a notification to the user that the problematic computer file 302 is an unknown computer file. In exemplary embodiments, the identification system 134 can mark the problematic computer file 302 for deletion/removal from the computer system.

In operation 512, the identification system 134 can be executed by the processor of the computing device to delete or instruction to another computing device to delete the problematic computer file that has been marked for deletion.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system for improved maintenance of a distributed computing system including software servers hosting one or more computer files, the system comprising:

one or more data storage devices including a non-transitory computer-readable media storing a deployment database and a binary repository, wherein the deployment database and binary repository are separate and distinct from each other;

a build system executed by a selected one of the servers including a processor communicatively coupled to the one or more data storage devices to facilitate communication between the processor and the deployment database and between the processor and the binary repository, execution of the build system by the selected one of the servers, in response to receiving a known computer file to be deployed, (i) generates unique signature for the known computer file, (ii) generates metadata for the known computer file, (iii) creates an entry in the deployment database including the unique signature for the known computer file, (iv) associates the metadata with the unique signature in the deployment database, and (v) deploys the known computer file into the binary repository to distribute the known computer file to one or more of the software servers in the distributed computing system, wherein the binary repository stores an instance of the deployed known computer file;

an identification system executed by the selected one of the servers or a different one of the servers including a processor communicatively coupled to the one or more data storage devices to facilitate communication between the processor and the deployment database, execution of the identification system by the selected one of the servers or a different one of the servers, in response to receiving a problematic computer file that is deployed in the distributed computing system and causing an issue in the distributed computing system, (i) generates a unique signature for the problematic computer file, and (ii) submits a query including the unique signature for the problematic computer file to determine whether the problematic computer file is the known computer file, wherein, in response to the signature of the problematic computer file matching the signature of the known computer file, the deployment database returns the metadata providing information for resolving the issue, and, in response to determining that the database contains no matches for the signature of the problematic computer file, the identification system determines that the problematic computer file is unidentifiable and a candidate for removal from the distributed system to resolve the issue.

2. The system of claim 1, wherein the metadata includes, filename, version date of creation, vendor name, programmer name, build identification parameter, information associated with deployment the known computer file, or information associated with a user or group responsible for maintenance of the known computer file or the one or more of the software servers to which the known computer file is distributed.

3. The system of claim 1, wherein a known computer file or the problematic computing file is an executable file.

4. The system of claim 1, wherein the identification system provides command line prompt to query the database.

5. The system of claim 1, wherein the metadata is displayed on a display for a user in response to the deployment database retrieving the metadata for the problematic computer file.

6. The system of claim 1, wherein the signature for the problematic computer file is not found in the deployment database.

7. The system of claim 6, wherein the identification system removes the problematic computer file in response to determining the problematic computer file is a candidate for removal.

8. A method for improved maintenance of a distributed computing system including software servers hosting one or more computer files, the method comprising:

executing a build system, by a selected one of the servers that includes a processor communicatively coupled to one or more data storage devices to facilitate communication between the processor and a deployment database stored on the one or more data storage devices and between the processor and a binary repository stored on the one or more data storage devices, in response to receiving a known computer file to be deployed, wherein the deployment database and binary repository are separate and distinct from each other;

generating, via the build system, a unique signature and metadata for the known computer file;

creating, via the build system, an entry in the deployment database including the unique signature for the known computer file;

associating, via the build system, the metadata with the unique signature in the deployment database;

deploying, via the build system, the known computer file into the binary repository to distribute the known computer file to one or more of the software servers in the distributed computing system, wherein the binary repository stores an instance of the deployed known computer file;

executing an identification system, by a selected one of the servers including a processor communicatively coupled to the one or more data storage devices to facilitate communication between the processor and a deployment database and between the processor and a binary repository, in response to receiving a problematic computer file that is deployed in the distributed computing system and causing an issue in the distributed computing system;

generating, via the identification system, a unique signature for the problematic computer file; and submitting, via the identification system, a query including the unique signature for the problematic computer file to the deployment database to determine whether the problematic computer file is the known computer file;

wherein, in response to the signature of the problematic computer file matching the signature of the known computer file, the deployment database returns the metadata providing information for resolving the issue, and, in response to determining that the database contains no matches for the signature of the problematic computer file, the identification system determines that the problematic computer file is unidentifiable and a candidate for removal from the distributed system to resolve the issue.

9. The method of claim 8, further comprising displaying the metadata on a display for a user in response to the deployment database retrieving the metadata for the problematic computer file.

10. The method of claim 8, wherein the signature for the problematic computer file is not found in the deployment database.

11. The method of claim 8, further comprising removing the problematic computer file by the identification system in response to determining the problematic computer file is a candidate for removal.

12. The method in claim 8, wherein the metadata includes, filename, version date of creation, vendor name, programmer name, build identification parameter, information associated with deployment the known computer file, or information associated with a user or group responsible for maintenance of the known computer file or the one or more of the software servers to which the known computer file is distributed.

13. The method in claim 12, wherein the known computer file or the problematic computing file is an executable file.

14. The method in claim 12, wherein the identification system provides command line prompt to query the database.

15. A non-transitory computer readable memory medium storing instructions for improved maintenance of a distributed computing system including software servers hosting one or more computer files, wherein the instructions are executable by a processor to:

execute a build system to facilitate communication between the processor and a deployment database stored on the one or more data storage devices and between the processor and a binary repository stored on the one or more data storage devices, in response to receiving a known computer file to be deployed, wherein the deployment database and binary repository are separate and distinct from each other;

generate, via the build system, a unique signature and metadata for the known computer file;

creating, via the build system, an entry in the deployment database including the unique signature for the known computer file;

associate, via the build system, the metadata with the unique signature in the deployment database;

deploy, via the build system, the known computer file into the binary repository to distribute the known computer file to one or more of the software servers in the distributed computing system, wherein the binary repository stores an instance of the deployed known computer file;

execute an identification system, by a selected one of the servers including a processor communicatively coupled to the one or more data storage devices to facilitate communication between the processor and a deployment database and between the processor and a binary repository, in response to receiving a problematic computer file that is deployed in the distributed computing system and causing an issue in the distributed computing system;

generate, via the identification system, a unique signature for the problematic computer file; and submit, via the identification system, a query including the unique signature for the problematic computer file to the deployment database to determine whether the problematic computer file is the known computer file;

wherein, in response to the signature of the problematic computer file matching the signature of the known computer file, the deployment database returns the metadata providing information for resolving the issue, and, in response to determining that the database contains no matches for the signature of the problematic computer file, the identification system determines that the problematic computer file is unidentifiable and a candidate for removal from the distributed system to resolve the issue.

16. The non-transitory computer readable memory medium in claim 15, wherein the instructions are executable by a processor to display the metadata on a display for a user in response to the deployment database retrieving the metadata for the problematic computer file.

17. The non-transitory computer readable memory medium in claim 15, wherein the instructions are executable by a processor to remove the problematic computer file by the identification system in response to determining the problematic computer file is a candidate for removal.

18. The non-transitory computer readable memory medium in claim 15, wherein the metadata includes, filename, version date of creation, vendor name, programmer name, build identification parameter, information associated with deployment the known computer file, or information associated with a user or group responsible for maintenance of the known computer file or the one or more of the software servers to which the known computer file is distributed.

19. The non-transitory computer readable memory medium in claim 18, wherein the known computer file or the problematic computing file is an executable file or an application.

* * * * *